S. D. JENNINGS.
CORN AND COTTON PLANTER.
APPLICATION FILED AUG. 17, 1914.
1,177,247.
Patented Mar. 28, 1916.
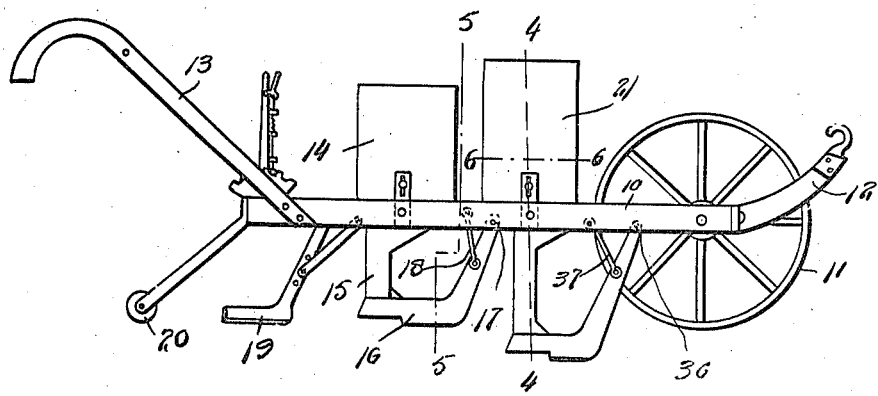
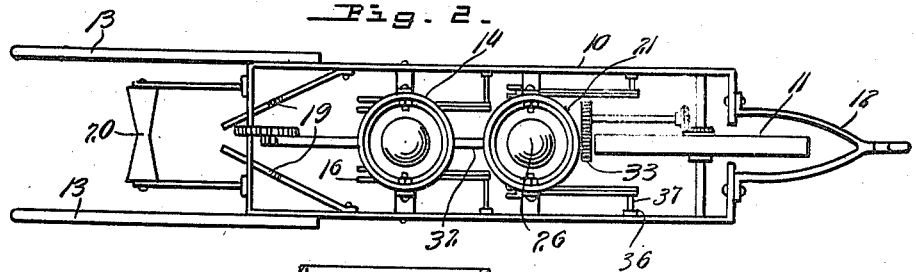
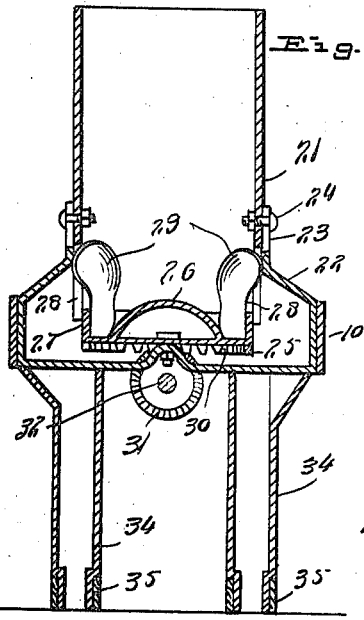
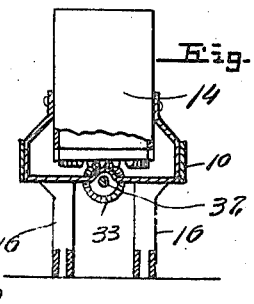
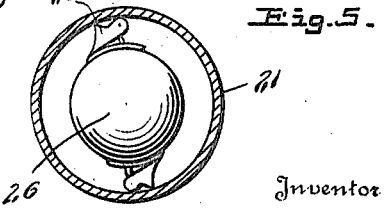

UNITED STATES PATENT OFFICE.

SILAS D. JENNINGS, OF TONEY, ALABAMA.

CORN AND COTTON PLANTER.

1,177,247.

Specification of Letters Patent.

Patented Mar. 28, 1916.

Application filed August 17, 1914. Serial No. 857,247.

*To all whom it may concern:*

Be it known that I, SILAS D. JENNINGS, a citizen of the United States, residing at Toney, in the county of Madison, State of Alabama, have invented certain new and useful Improvements in Corn and Cotton Planters; and I do hereby declare the following to be a full, clear, and exact description of the invention, such as will enable others skilled in the art to which it appertains to make and use the same.

This invention relates to improvements in planting machines.

One object of the invention is to provide a planting machine which will distribute fertilizer simultaneously with the planting of the seed, and at the sides of the row instead of in the middle of the row.

Another object is to provide a novel means for adjusting the flow of the fertilizer.

Other objects and advantages will be apparent from the following description, when taken in connection with the accompanying drawings.

In the drawings: Figure 1 is a side elevation of a planting machine made in accordance with my invention. Fig. 2 is a top plan view. Fig. 3 is a vertical sectional detail on the line 4—4 of Fig. 1. Fig. 4 is a vertical sectional view on the line 5—5 of Fig. 1, the fertilizer hopper being partly broken away. Fig. 5 is a horizontal sectional view on the line 6—6 of Fig. 1.

Referring particularly to the accompanying drawings, 10 represents a frame which has a ground wheel 11 mounted in the forward end and the draft means 12 also mounted on the forward end of the frame. Suitable handles 13 are mounted on the rear of the frame. Mounted on the frame in advance of the handles is a seed hopper 14, and extending below this hopper is a seed boot or tube 15. Shoes 16 are disposed at the sides of the bottom of the boot and have their forward ends pivotally connected with the frame as at 17 and suitably braced as at 18. In rear of the shoes are mounted the covering blades 19, while in rear of the covering blades is a smoothing roller 20, this roller being in the form of a double cone so as to form a ridge over the seed which has been planted. In advance of the seed hopper is a hopper 21 which is adapted to contain lime or other suitable fertilizer. Carried by the lower open end of the hopper 21 is a frame 22, the frame having vertical slotted arms 23 which receive bolts 24 carried by the sides of the hopper. Rotatably mounted on this frame, directly below the open end of the hopper is a bottom plate 25, said bottom plate having a central elevation 26 and a vertically extending circumferential flange 27. In diametrically opposite sides in the lower end of the hopper are formed openings 28, and secured within these openings are the delivering elements 29, these elements being similar in shape to the ordinary turning plow but on a smaller scale. The lower ends of these delivering elements rest within the space between the elevation 26 and the flange 27 so that as the bottom member 25 rotates these delivering devices will scrape the lime from the bottom member and deliver it over the edge of the flange 27. The bottom of the member 25 is provided with a toothed ring 30 which is engaged by a pinion 31 carried by a shaft 32 extending longitudinally of the frame 10 under both of the hoppers. The shaft also carries a pinion 33 for operating the seed disk of the hopper 14.

Below each of the delivering devices 30 is a boot 34 to the lower end of each of which there are connected the shoes 35, the forward ends of the shoes are connected with the frame 10 at 36 and braced as at 37. These boots 34 are slightly longer than the boots 15 so that the lime will be placed at a greater depth than the seed. It will be noticed that the shoes 35 are disposed on opposite sides of the line of travel of the shoes 16, thus causing the lime to be deposited at the sides of the line of seed instead of in the line as with devices of this character heretofore.

What is claimed is:

In a fertilizer distributer, brackets, a hopper vertically adjustable on the brackets and having a rotatable bottom provided with a central elevation and a peripheral vertical flange, means below the hopper for delivering fertilizer to the ground, the lower end of the body of the hopper being open and embracing the said rotatable bottom, said lower end having a circular series of openings, and flow-shaped scraper elements mounted at opposite sides of the hopper and engaging in the rotary bottom between the elevation and the flange for scraping the fertilizer over the said flange and through said openings.

In testimony whereof I affix my signature, in the presence of two witnesses.

SILAS D. JENNINGS.

Witnesses:
J. E. CRUTCHER,
P. C. JENNINGS.